United States Patent
Ramirez Reina et al.

(10) Patent No.: US 11,673,123 B2
(45) Date of Patent: Jun. 13, 2023

(54) CATALYSTS FOR THE REFORMING OF GASEOUS MIXTURES

(71) Applicants: University of Surrey, Guildford (GB); University of Alicante, San Vicente del Raspeig (ES)

(72) Inventors: Tomas Ramirez Reina, Guildford (GB); Estelle Le Saché, Guildford (GB); Sai Gu, Guildford (GB); David Watson, Guildford (GB); Laura Pastor Pérez, San Vicente del Raspeig (ES); Antonio Sepúlveda Escribano, San Vicente del Raspeig (ES)

(73) Assignees: University of Surrey, Guildford (GB); University of Alicante, San Vicente del Raspeig (ES)

( * ) Notice: Subject to any disclaimer, the term of this patent is extended or adjusted under 35 U.S.C. 154(b) by 426 days.

(21) Appl. No.: 16/493,616

(22) PCT Filed: Mar. 12, 2018

(86) PCT No.: PCT/GB2018/050621
§ 371 (c)(1),
(2) Date: Sep. 12, 2019

(87) PCT Pub. No.: WO2018/167467
PCT Pub. Date: Sep. 20, 2018

(65) Prior Publication Data
US 2020/0061588 A1    Feb. 27, 2020

(30) Foreign Application Priority Data
Mar. 14, 2017    (GB) .................................. 1704017

(51) Int. Cl.
*B01J 23/83* (2006.01)
*B01J 23/00* (2006.01)
(Continued)

(52) U.S. Cl.
CPC ............. *B01J 23/83* (2013.01); *B01J 23/002* (2013.01); *B01J 35/0066* (2013.01);
(Continued)

(58) Field of Classification Search
None
See application file for complete search history.

(56) References Cited

U.S. PATENT DOCUMENTS

| 8,133,463 B1 | 3/2012 | Berry et al. |
| 2008/0260628 A1 | 10/2008 | Moon et al. |

(Continued)

FOREIGN PATENT DOCUMENTS

| CN | 101017896 A | 8/2007 |
| CN | 101352687 A | 1/2009 |

(Continued)

OTHER PUBLICATIONS

G. S. Gallego et al., CO2 reforming of CH4 over La—Ni based perovskite precursors, Applied Catalysis A: General, 2006, 311, 164-171 (Year: 2006).*

(Continued)

*Primary Examiner* — Coris Fung
*Assistant Examiner* — Keling Zhang
(74) *Attorney, Agent, or Firm* — McCarter & English, LLP; Steven G. Davis; Wei Song

(57) ABSTRACT

Pyrochlore-based solid mixed oxide materials suitable for use in catalysing a hydrocarbon reforming reaction are disclosed, as well as methods of preparing the materials, and their uses in hydrocarbon reforming processes. The materials contain a catalytic quantity of inexpensive nickel and exhibit catalytic properties in dry reforming reactions that are comparable—if not better—than those observed using expensive noble metal-containing catalysts. Moreover, the Pyrochlore-based solid mixed oxide materials can be used in (Continued)

low temperature dry reforming reactions, where other catalysts would become deactivated due to coking. Accordingly, the catalytic materials represent a sizeable development in the industrial-scale reforming of hydrocarbons.

19 Claims, 16 Drawing Sheets

(51) Int. Cl.
  B01J 35/00 (2006.01)
  B01J 35/02 (2006.01)
  B01J 35/10 (2006.01)
  B01J 37/00 (2006.01)
  B01J 37/08 (2006.01)
  B01J 37/18 (2006.01)
  C01B 3/40 (2006.01)
  C01G 53/00 (2006.01)

(52) U.S. Cl.
  CPC ......... B01J 35/026 (2013.01); B01J 35/1009 (2013.01); B01J 35/1014 (2013.01); B01J 35/1038 (2013.01); B01J 35/1061 (2013.01); B01J 37/0018 (2013.01); B01J 37/08 (2013.01); B01J 37/18 (2013.01); C01B 3/40 (2013.01); C01G 53/70 (2013.01); B01J 2523/3706 (2013.01); B01J 2523/48 (2013.01); B01J 2523/847 (2013.01); C01B 2203/0238 (2013.01); C01B 2203/1058 (2013.01); C01B 2203/1241 (2013.01); C01P 2002/36 (2013.01); C01P 2002/72 (2013.01); C01P 2002/82 (2013.01); C01P 2004/03 (2013.01); C01P 2006/12 (2013.01); C01P 2006/14 (2013.01); C01P 2006/16 (2013.01)

(56) References Cited

U.S. PATENT DOCUMENTS

| | | | |
|---|---|---|---|
| 2013/0302241 A1 | 11/2013 | Pieterse | |
| 2014/0145117 A1 | 5/2014 | Bal et al. | |
| 2015/0014591 A1 | 1/2015 | D'Souza et al. | |
| 2015/0148216 A1 | 5/2015 | Nazarpoor et al. | |
| 2016/0001269 A1 | 1/2016 | Bordoloi et al. | |

FOREIGN PATENT DOCUMENTS

| | | |
|---|---|---|
| CN | 103752319 B | 8/2016 |
| DE | 202006009527 U1 | 8/2006 |
| GB | 2239406 A | 7/1991 |
| GB | 2536166 A | 9/2016 |
| JP | 6-208806 A | 7/1994 |
| JP | 2012-239982 A | 12/2012 |
| WO | 2001/31687 A2 | 5/2001 |
| WO | 2012/167351 A1 | 12/2012 |

OTHER PUBLICATIONS

S. Maluf et al., Ni catalyst with Mo promoter for methane steam reforming, Fuel, 2009, 88, 1547-1553 (Year: 2009).*
Gallego et al., CO2 reforming of CH4 over La—Ni based perovskite precursors, Applied Catalysis A: General, 2006, 311, 164-171 (Year: 2006).*
Bespalko et al., Comparative study of NiLaZr and CoLaZr catalysts for hydrogen production by ethanol steam reforming: Effect of CO 2 injection to the gas reactants. Evidence of Rh role as a promoter. Applied Catalysis A General. Nov. 2011;407(1):204-10.
Bussi et al., The preparation and properties of Ni—La—Zr catalysts for the steam reforming of ethanol. Catalysis Communications. Oct. 10, 2008;10(1):33-8.
Ma et al., Nickel-Supported on La2Sn2O7 and La2Zr2O7 Pyrochlores for Methane Steam Reforming: Insight into the Difference between Tin and Zirconium in the B Site of the Compound. ChemCatChem. Oct. 30, 2014;6:3366-76.
Great Britain Office Action for Application No. GB1704017.1, dated Sep. 5, 2017, 4 pages.
International Search Report and Written Opinion for Application No. PCT/GB2018/050621, dated May 15, 2018, 16 pages.

* cited by examiner

CATALYSTS FOR THE REFORMING OF GASEOUS MIXTURES

CROSS-REFERENCE TO RELATED APPLICATIONS

This application is a U.S. national stage filing, under 35 U.S.C. § 371(c), of International Application No. PCT/GB2018/050621, filed on Mar. 12, 2018, which claims priority to United Kingdom Patent Application No. 1704017.1, filed on Mar. 14, 2017. The entire contents of each of the aforementioned applications are incorporated herein by reference.

INTRODUCTION

The present invention relates to solid mixed oxide materials suitable for use in catalysing hydrocarbon reforming reactions. More specifically, the present invention relates to pyrochlore-based solid mixed oxide materials suitable for use in catalysing a dry reforming reaction. The present invention also relates to processes of making the solid mixed oxide materials, as well as their use in the reforming of hydrocarbons.

BACKGROUND OF THE INVENTION

The growing trend of $CO_2$ emissions driven by the increase of global energy consumption is one of the main driving forces for global warming and the current climate change phenomena. In this scenario, the $CO_2$ challenge represents a unique opportunity for scientists and engineers to apply their understanding and expertise to provide sustainable solutions. The conversion of $CO_2$ into fuels and useful chemicals has been intensively pursued for renewable, sustainable and green energy.

Dry reforming is a method of converting carbon dioxide and hydrocarbons, such as methane, into synthesis gas (often termed syngas). The basic equation for the dry reforming of methane is as follows:

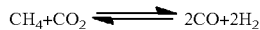
$$CH_4 + CO_2 \rightleftharpoons 2CO + 2H_2$$

The production of syngas—a fuel gas mixture consisting primarily of hydrogen and carbon monoxide—from carbon dioxide and methane has received a great deal of interest by those who recognize its value as an alternative fuel source to fossil fuels. In particular, both carbon dioxide and methane are widely abundant and are commonly understood to be major contributors to global warming, meaning that the ability to convert these feedstocks into cleaner fuel sources has attracted widespread interest.

Owing to the chemical stability of carbon dioxide, the dry reforming reaction does not occur spontaneously, and instead needs to be catalyzed. It is therefore necessary that the catalyst is able to withstand the high temperatures and long operational times required for dry reforming. The same is also true for bi-reforming catalysts and tri-reforming catalysts.

Research into the development of useful hydrocarbon reforming catalysts, such as dry reforming catalysts, has centered on the use of catalytic metals supported on a range of high surface area substrates, including aluminas, silicas and mixed metal oxides. However, current catalysts suffer from deactivation caused by carbon formation (favoured at low dry reforming operational temperatures) and/or poor selectively for hydrogen and carbon monoxide. In addition, catalytic performance is known to be hampered by sintering of the active metals, which renders the catalysts more susceptible to the deleterious effects of coking. Whilst the use of expensive noble metals in dry reforming catalysts has succeeded in mitigating some of these problems, the cost of such materials is seen as a limiting factor for industrial scale-up.

As a consequence, there is a need for a new generation of cost-effective, high-efficiency materials useful in catalyzing hydrocarbon reforming reactions.

The present invention was devised with the foregoing in mind.

SUMMARY OF THE INVENTION

According to a first aspect of the present invention there is provided a solid mixed oxide material suitable for use in catalysing a methane dry reforming reaction, wherein the solid mixed oxide material comprises a first crystalline phase, the first crystalline phase being attributable to a pyrochlore crystal structure, and wherein the solid mixed oxide material comprises 3.5-25.0% of nickel by weight relative to the total weight of the solid mixed oxide material.

According to a second aspect of the present invention there is provided a process for the preparation of a solid mixed oxide material of the first aspect, said process comprising the steps of:
a) providing a mixture comprising
  i. at least one solvent;
  ii. metal precursors, the respective amounts of the metal precursors being sufficient to form a pyrochlore crystalline phase in the solid mixed oxide material resulting from step c), and
  iii. at least one chelating agent;
b) drying the mixture of step a); and
c) thermally treating the solid material resulting from step b) at a temperature greater than 800° C.,
wherein at least one of the metal precursors mixed in step a) is a nickel precursor in an amount sufficient to provide a nickel content in the solid mixed oxide material resulting from step c) of 3.5-25.0% by weight relative to the total weight of the solid mixed oxide material.

According to a third aspect of the present invention there is provided a reduced or partially-reduced solid mixed oxide material, wherein the reduced or partially-reduced solid mixed oxide material is a reduced or partially-reduced form of the solid mixed oxide material of the first aspect.

According to a fourth aspect of the present invention there is provided a process for the preparation of a reduced or partially-reduced solid mixed oxide material of the third aspect, the process comprising the step of:
a) reducing or partially-reducing the solid mixed oxide material of the first aspect.

According to a fifth aspect of the present invention there is provided a solid mixed oxide material obtainable, obtained or directly obtained by the process of the second aspect.

According to a sixth aspect of the present invention there is provided a reduced or partially-reduced solid mixed oxide material obtainable, obtained or directly obtained by the process of the fourth aspect.

According to a seventh aspect of the present invention there is provided a process for catalytically reforming a gaseous mixture, said process comprising the step of:
a) contacting a gaseous mixture comprising $CO_2$ and $CH_4$ with either or both of:
  i. a solid mixed oxide material of the first or fifth aspect, and ii. a reduced or partially-reduced solid mixed oxide material of the third or sixth aspect, wherein step a) is conducted at a temperature of 500-1000° C.

In the following paragraphs, it will be appreciated that suitable, preferred and optional features of any particular aspect of the invention are also suitable, preferred and optional features of any other aspect of the invention.

DETAILED DESCRIPTION OF THE INVENTION

Solid Mixed Oxide Material

As described hereinbefore, the present invention provides a solid mixed oxide material suitable for use in catalysing a methane dry reforming reaction, wherein the solid mixed oxide material comprises a first crystalline phase, the first crystalline phase being attributable to a pyrochlore crystal structure, and wherein the solid mixed oxide material comprises 3.5-25.0% of nickel by weight relative to the total weight of the solid mixed oxide material.

In stark contrast to the current direction of research in the field, the present inventors have now surprisingly found that efficient catalysis of hydrocarbon reforming reactions is not limited solely to materials containing catalytic quantities of expensive noble metals. Instead, the inventors have developed a solid mixed oxide material suitable for use in catalysing hydrocarbon reforming reactions (e.g. the dry reforming of methane) based on a pyrochlore-based substrate containing a catalytic quantity of highly inexpensive nickel. As evidenced herein, the use of small quantities of nickel in pyrochlore-based hydrocarbon reforming catalysts has in the past been demonstrated to give rise to significantly lower selectivities for hydrogen and carbon monoxide. Moreover, such low nickel content pyrochlore-based materials were held to be readily susceptible to catalytic deactivation by metallic sintering and coking. Such drawbacks have therefore created a prejudice towards the use of more expensive noble metal-based catalytic materials, which have not only been demonstrated to offer better product selectivity, but are also notably less susceptible to deactivation. However, not only do the higher nickel content solid mixed oxide materials of the invention—as-prepared or in their reduced form—demonstrate a high selectively for hydrogen and carbon monoxide during hydrocarbon reforming reactions, they are able to do so at operating temperatures so low that they would otherwise lead to the deactivation of conventional Ni-containing catalysts by nickel sintering and/or coking. As a consequence, the solid mixed oxide materials of the invention allow hydrocarbon reforming to be carried out in a considerably less energy-intensive manner than with other catalysts. When this advantage is considered alongside the cost saving of using catalytic quantities of nickel, as opposed to a noble metal, the solid mixed oxide materials of the invention represent a sizeable development in the industrial-scale reforming of hydrocarbons, such as methane.

The pyrochlore crystal structure will be familiar to one of ordinary skill in the art. It is a mixed oxide structure of half trivalent cations and half tetravalent cations in a cubic cell structure, with the general stoichiometry $A_2B_2O_7$. The A-site is typically a large cation (often a rare earth element) and is coordinated with eight oxygen atoms. The B-site cation (often a transition metal) has a smaller radius and is coordinated with six oxygen atoms. In order to form a stable pyrochlore, A and B cations must have an ionic radius ratio $r_A/r_B$ of between 1.46 and 1.80. Owing to their chemical stability and ability to resist decomposition at high temperatures, pyrochlores are a useful substrate for hydrocarbon reforming catalysts. Moreover, the mechanical stability of pyrochlores allows them to accommodate catalytically-useful metals throughout their structure. The presence of active metal catalytic sites spatially distributed throughout a thermally-stable pyrochlore architecture is advantageous in that it may reduce the tendency of the metal to migrate to the surface, whereby it would be vulnerable to the deleterious effects of sintering.

In an embodiment, the first crystalline phase has a composition according to general formula (I) shown below $$A_2B_2O_7 \qquad (I)$$

wherein

A is at least one trivalent cation of an element selected from the group consisting of La, Ce, Pr, Nd, Sm, Sc, Y and Eu; and B is a mixture of
i. at least one tetravalent or trivalent cation of an element selected from the group consisting of Zr, Ti, Cr, Mn and Mo, and
ii. a divalent cation of Ni.

Suitably, the first crystalline phase has a composition according to general formula (I), wherein A is a trivalent cation of La, and optionally one or more other trivalent cations of an element selected from the group consisting of Ce, Pr, Nd, Sm, Sc, Y and Eu; and B is a mixture of
i. a tetravalent cation of Zr, and optionally one or more other tetravalent or trivalent cations of an element selected from the group consisting of Ti, Cr, Mn and Mo, and
ii. a divalent cation of Ni.

More suitably, the first crystalline phase has a composition according to general formula (I), wherein A is a trivalent cation of La and B is a mixture of a tetravalent cation of Zr and a divalent cation of Ni.

In an embodiment, at least a portion of the nickel is located outside the pyrochlore crystal structure (e.g. on its surface). Accordingly, the solid mixed oxide material may comprise both crystalline nickel (i.e. nickel contributing to the pyrochlore crystal lattice) and non-crystalline (i.e. beyond the detection limit of XRD) nickel. Without wishing to be bound by theory, it is believed that this mixture of crystalline and non-crystalline nickel contributes to the advantageous properties of the solid mixed oxide materials.

In an embodiment, the nickel is dispersed throughout the solid mixed oxide material.

In an embodiment, the solid mixed oxide material comprises 5.0-25.0% of nickel by weight relative to the total weight of the solid mixed oxide material. The amount of elemental nickel is determined by EDX analysis. Suitably, the solid mixed oxide material comprises 7.5-20.0% of nickel by weight relative to the total weight of the solid mixed oxide material. More suitably, the solid mixed oxide material comprises 7.5-17.5% of nickel by weight relative to the total weight of the solid mixed oxide material. Yet more suitably, the solid mixed oxide material comprises 9.0-15.0% of nickel by weight relative to the total weight of the solid mixed oxide material. Yet more suitably, the solid mixed oxide material comprises 9.5-14.0% of nickel by weight relative to the total weight of the solid mixed oxide material. Most suitably, the solid mixed oxide material comprises 10.0-13.0% of nickel by weight relative to the total weight of the solid mixed oxide material.

In an embodiment, the solid mixed oxide material comprises a second crystalline phase, the second crystalline phase being attributable to the perovskite, Ruddlesden-Popper or rock salt crystal structure, or a mixture thereof. Suitably, the second crystalline phase is attribute to the Ruddlesden-Popper crystal structure. The Ruddlesden-Popper crystal structure will be familiar to one of ordinary skill in the art. It is a mixed oxide structure composed of $ABO_3$ perovskite-like layers separated by single AO rock salt-like layers. The Ruddlesden-Popper phase is particularly apparent when the solid mixed oxide material comprises high quantities of nickel, such as more than 5.0% by weight (e.g. 7.5-17.5% or 9.0-15.0% by weight).

In an embodiment, the solid mixed oxide material comprises a second crystalline phase whose X-ray diffraction pattern exhibits a peak at 2θ 44-46°.

In an embodiment, the solid mixed oxide material comprises a second crystalline phase whose X-ray diffraction pattern exhibits a peak at 2θ 30-33°.

Suitably, the solid mixed oxide material comprises a second crystalline phase whose X-ray diffraction pattern exhibits a peak at 2θ 44-46° and a peak at 2θ 30-33°.

In an embodiment, the second crystalline phase has a composition according to general formula (II) shown below $$A'_2B'O_4 \qquad (II)$$

wherein

A' is at least one trivalent cation of an element selected from the group consisting of La, Ce, Pr, Nd, Sm, Sc, Y and Eu; and B' is a divalent cation of Ni, and optionally one or more other divalent, trivalent or tetravalent cations of an element selected from the group consisting of Fe, Co, Cu, Ti and Zr.

Suitably, the second crystalline phase has a composition according to general formula (II), wherein A' is a trivalent cation of La, and optionally one or more other trivalent cations of an element selected from the group consisting of Ce, Pr, Nd, Sm, Sc, Y and Eu; and B' is a divalent cation of Ni.

More suitably, the second crystalline phase has a composition according to general formula (II), wherein A' is a trivalent cation of La; and B' is a divalent cation of Ni.

In an embodiment, the solid mixed oxide material further comprises 0.001-0.5% of at least one promoter by weight relative to the total weight of the solid mixed oxide material, and wherein the at least one promoter is selected from the group consisting of Sn, Ba, Ca, Mg, Ce, Sr, K, Pt, Rh, Pd, Mo, Ag, Au, Ru, Zn, Cu, Co and Ir. Promoters are typically used in hydrocarbon reforming catalytic materials to enhance catalyst stability, reduce metal sintering and attenuate carbon deposition. They influence different parameters such as metal dispersion or support redox properties as well the acid/base properties of the catalysts. Their role is considered to be entirely distinct from that of the active nickel metal, which is reflected in the smaller quantities in which they are used. Suitably, the promoter is present in an amount of 0.001-0.3% by weight relative to the total weight of the solid mixed oxide material.

In an embodiment, the solid mixed oxide material comprises no more than 0.5% of noble metal by weight relative to the total weight of the solid mixed oxide material. For the avoidance of doubt, the term "noble metal" used herein will be understood to include ruthenium, rhodium, palladium, silver, osmium, iridium, platinum and gold.

Suitably, the solid mixed oxide material further comprises 0.001-0.5% of at least one promoter by weight relative to the total weight of the solid mixed oxide material, and wherein the at least one promoter is selected from the group consisting of Sn, Ba, Ca, Mg, Ce, Pt, Rh, Co, Ir, Au. More suitably, the solid mixed oxide material further comprises 0.001-0.5% of at least one promoter by weight relative to the total weight of the solid mixed oxide material, and wherein the at least one promoter is selected from the group consisting of Sn and Ce.

In an embodiment, the solid mixed oxide material comprises 15.0-35.0% of zirconium by weight relative to the total weight of the solid mixed oxide material. Suitably, the solid mixed oxide material comprises 15.0-30.0% of zirconium by weight relative to the total weight of the solid mixed oxide material. More suitably, the solid mixed oxide material comprises 17.5-27.5% of zirconium by weight relative to the total weight of the solid mixed oxide material. Yet more suitably, the solid mixed oxide material comprises 17.5-25.0% of zirconium by weight relative to the total weight of the solid mixed oxide material. Most suitably, the solid mixed oxide material comprises 18.0-22.5% of zirconium by weight relative to the total weight of the solid mixed oxide material.

In an embodiment, the solid mixed oxide material comprises 48.0-60.0% of lanthanum by weight relative to the total weight of the solid mixed oxide material. Suitably, the solid mixed oxide material comprises 50.0-58.0% of lanthanum by weight relative to the total weight of the solid mixed oxide material. More suitably, the solid mixed oxide material comprises 50.0-56.5% of lanthanum by weight relative to the total weight of the solid mixed oxide material. Most suitably, the solid mixed oxide material comprises 50.5-54.5% of lanthanum by weight relative to the total weight of the solid mixed oxide material.

In an embodiment, the solid mixed oxide material comprises 10.0-20.0% of oxygen by weight relative to the total weight of the solid mixed oxide material. Suitably, the solid mixed oxide material comprises 11.0-17.5% of oxygen by weight relative to the total weight of the solid mixed oxide material. More suitably, the solid mixed oxide material comprises 11.5-17.0% of oxygen by weight relative to the total weight of the solid mixed oxide material. Most suitably, the solid mixed oxide material comprises 14.5-16.5% of oxygen by weight relative to the total weight of the solid mixed oxide material.

In an embodiment, the solid mixed oxide material comprises 17.5-27.5% of zirconium by weight and 50.0-58.0% of lanthanum by weight relative to the total weight of the solid mixed oxide material. Suitably, the solid mixed oxide material further comprises 11.0-17.5% of oxygen by weight relative to the total weight of the solid mixed oxide material.

In an embodiment, the solid mixed oxide material comprises 17.5-25.0% of zirconium by weight and 50.0-56.5% of lanthanum by weight relative to the total weight of the solid mixed oxide material. Suitably, the solid mixed oxide material further comprises 11.5-17.0% of oxygen by weight relative to the total weight of the solid mixed oxide material.

In an embodiment, the solid mixed oxide material comprises 18.0-22.5% of zirconium by weight and 50.5-54.5% of lanthanum by weight relative to the total weight of the solid mixed oxide material. Suitably, the solid mixed oxide material further comprises 11.5-17.0% or 14.5-16.5% of oxygen by weight relative to the total weight of the solid mixed oxide material.

In an embodiment, the surface area of the solid mixed oxide material is 5-25 m$^2$/g. The surface area of the materials was determined by N$_2$ adsorption-desorption isotherm analysis. Suitably, the surface area of the solid mixed oxide material is 7-20 m$^2$/g. More suitably, the surface area of the solid mixed oxide material is 9-17 m²/g. Yet more suitably, the surface area of the solid mixed oxide material is 9-14 m²/g.

In an embodiment, the pore volume of the solid mixed oxide material is 0.02-0.2 cm³/g. The pore volume of the materials was determined by $N_2$ adsorption-desorption isotherm analysis. Suitably, the pore volume of the solid mixed oxide material is 0.035-0.17 cm³/g. More suitably, the pore volume of the solid mixed oxide material is 0.04-0.15 cm³/g. Yet more suitably, the pore volume of the solid mixed oxide material is 0.06-0.13 cm³/g. Most suitably, the pore volume of the solid mixed oxide material is 0.075-0.11 cm³/g.

In an embodiment, the average pore size of the solid mixed oxide material is 2.0-10.0 nm. The average pore size of the materials was determined by $N_2$ adsorption-desorption isotherm analysis. Suitably, the average pore size of the solid mixed oxide material is 2.0-8.0 nm. More suitably, the average pore size of the solid mixed oxide material is 2.0-6.5 nm. Yet more suitably, the average pore size of the solid mixed oxide material is 2.5-6.0 nm. Most suitably, the average pore size of the solid mixed oxide material is 3.5-5.5 nm.

In an embodiment, the solid mixed oxide material is in the form of a powder, pellet or foam.

In an embodiment, the solid mixed oxide material is self-supported.

Preparation of Solid Mixed Oxide Materials

As described hereinbefore, the present invention also provides a process for the preparation of a solid mixed oxide material of the first aspect, said process comprising the steps of:
a) providing a mixture comprising
  i. at least one solvent;
  ii. metal precursors, the respective amounts of the metal precursors being sufficient to form a pyrochlore crystalline phase in the solid mixed oxide material resulting from step c), and
  iii. at least one chelating agent;
b) drying the mixture of step a); and
c) thermally treating the solid material resulting from step b) at a temperature greater than 800° C.,
wherein at least one of the metal precursors mixed in step a) is a nickel precursor in an amount sufficient to provide a nickel content in the solid mixed oxide material resulting from step c) of 3.5-25.0% by weight relative to the total weight of the solid mixed oxide material.

The inventors have surprising found that the present process, which includes a step of combining metal precursors in respective amounts sufficient to give a solid mixed oxide material comprising 3.5-25.0% of nickel by weight relative to the total weight of the solid mixed oxide material, results in a material having a considerable number of advantages over conventional noble metal-containing hydrocarbon reforming catalysts. Such advantages are set out in full in relation to the first aspect of the invention.

The skilled person will be familiar with the concept of mixing together metal precursors in respective amounts sufficient to give a particular stoichiometry. Accordingly, given his knowledge of the pyrochlore crystal structure, the skilled person will be readily capable of calculating the respective amounts of metal precursors required in step a) to produce a pyrochlore crystalline phase in the material resulting from step c). Moreover, it will be appreciated that two different metal precursors are typically required to form the pyrochlore crystal structure (setting aside the need for a nickel precursor).

In an embodiment, the metal precursors are selected from metal oxides and metal nitrates. For example, when the A-site and B-site in the pyrochlore crystalline phase are respectively La and Zr, the metal precursors may be lanthanum nitrate ($[La(NO_3)_3 \cdot 6H_2O]$) and zirconyl nitrate ($[ZrO(NO_3)_2 \cdot 6H_2O]$). In an embodiment, the nickel precursor is nickel nitrate ($[Ni(NO_3)_2 \cdot 6H_2O]$).

In an embodiment, the mixture provided in step a) further comprises:
  iv. at least one Sn, Ba, Ca, Mg, Ce, Sr, K, Pt, Rh, Pd, Mo, Ag, Au, Ru, Zn, Cu, Co or Ir-based promoter precursor in an amount sufficient to provide a promoter content in the solid mixed oxide material resulting from step c) of 0.001-0.5% by weight relative to the total weight of the solid mixed oxide material.

The skilled person will be readily capable of calculating the amount of promoter precursor(s) required in step a) such that the solid mixed oxide material resulting from step c) comprises 0.001-0.5% of promoter by weight relative to the total weight of the solid mixed oxide material.

In an embodiment, the at least one solvent is selected from the group consisting of water, methanol, ethanol and acetone. Suitably, the solvent is water.

In an embodiment, the at least one chelating agent is selected from the group consisting of citric acid, ethylenediaminetetraacetic acid (EDTA), disodium EDTA salt, trisodium EDTA salt, ethylene glycol-bis(β-aminoethyl ether)-N,N,N',N'-tetraacetic acid (EGTA) and succinic acid. Suitably, the at least one chelating agent is citric acid.

In an embodiment, the mixture of step a) comprises at least one chelating agent in an amount sufficient to give a molar ratio of total chelating agent to metal in the mixture of (0.3-1.0):1. Suitably, the mixture of step a) comprises at least one chelating agent in an amount sufficient to give a molar ratio of total chelating agent to metal in the mixture of (0.45-0.75):1.

In an embodiment, step c) comprises thermally treating the solid material resulting from step b) at a temperature of 800-1500° C. Suitably, step c) comprises thermally treating the solid material resulting from step b) at a temperature of 900-1300° C. More suitably, step c) comprises thermally treating the solid material resulting from step b) at a temperature of 900-1100° C.

In an embodiment, step c) is performed for 4-24 hours. Suitably, step c) is performed for 6-18 hours. More suitably, step c) is performed for 6-12 hours. Most suitably, step c) is performed for 6-10 hours.

In an embodiment, in step c) the temperature is increased at a rate of 1-10° C. per minute and then held at the target temperature. Suitably, in step c) the temperature is increased at a rate of 1-5° C. per minute and then held at the target temperature. Suitably, the dwell time at the target temperature is 6.5-9.5 hours (e.g. 7.5-8.5 hours).

The mixture resulting from step a) may be dried to a solid by any suitable means. In an embodiment, step b) comprises drying the mixture of step a) at a temperature of 60-150° C. in air. Suitably, step b) comprises drying the mixture of step a) at a temperature of 80-120° C. in air. Suitably step b) is performed for 6-24 hours (e.g. 6-18 hours).

In an embodiment, prior to step c), the solid material resulting from step b) is milled or crushed. Milling/crushing reduces the number of agglomerates that may form during drying step b), thereby resulting in a more uniform powder for thermal treatment.

Reduced/Partially-Reduced Solid Mixed Oxide Materials

As described hereinbefore, the present invention also provides a reduced or partially-reduced solid mixed oxide material, wherein the reduced or partially-reduced solid mixed oxide material is a reduced or partially-reduced form of the solid mixed oxide material according to the first aspect.

The solid mixed oxide materials of the invention may be used in hydrocarbon reforming reactions in their fresh (i.e. as-prepared) form, or in a reduced or partially-reduced form. The reduced or partially-reduced solid mixed oxide material will contain a greater quantity of nickel metal (Ni) rather than nickel oxide (NiO).

The reduced or partially-reduced solid mixed oxide material may be formed by reducing or partially reduced the solid mixed oxide material of the first aspect. The skilled person will appreciate that the solid mixed oxide material of the first aspect may be reduced by a variety of means (e.g. by heating in a hydrogen stream or by treatment with a chemical reducing agent). Owing to the production of hydrogen, the reduced or partially-reduced solid mixed oxide material may be formed in-situ when the solid mixed oxide material of the first aspect is used in a hydrocarbon reforming reaction.

In an embodiment, the reduced or partially-reduced solid mixed oxide material may be formed by heating (e.g. at a temperature of 400-1000° C.) the solid mixed oxide material of the first aspect under an atmosphere of hydrogen. Suitably, the reduced or partially-reduced solid mixed oxide material may be formed by heating the solid mixed oxide material of the first aspect under a $H_2$/He atmosphere at a temperature of 400-1000° C. (e.g. 600-900° C.).

The term "activated" is used synonymously herein with the term "reduced".

Preparation of Reduced/Partially-Reduced Solid Mixed Oxide Materials

As described hereinbefore, the present invention also provides a process for the preparation of a reduced or partially-reduced solid mixed oxide according to the third aspect, the process comprising the step of:

a) reducing or partially-reducing the solid mixed oxide material of the first aspect.

The solid mixed oxide materials of the invention may be used in hydrocarbon reforming reactions in their fresh (i.e. as-prepared) form, or in a reduced or partially-reduced form. The reduced or partially-reduced solid mixed oxide material will contain a greater quantity of nickel metal (Ni) rather than nickel oxide (NiO).

The skilled person will appreciate that the solid mixed oxide material of the first aspect may be reduced by a variety of means (e.g. by heating in a hydrogen stream or by treatment with a chemical reducing agent)

In an embodiment, step a) comprises heating (e.g. at a temperature of 400-1000° C.) the solid mixed oxide material of the first aspect under an atmosphere of hydrogen. Suitably, step a) comprises heating the solid mixed oxide material of the first aspect under a $H_2$/He atmosphere at a temperature of 400-1000° C. (e.g. 600-900° C.). Suitably, step a) is performed for between 10 minutes and 10 hours. More suitably, step a) is performed by 0.5-3 hours.

Process for Catalytically Reforming a Gaseous Mixture

As described hereinbefore, the present invention also provides a process for catalytically reforming a gaseous mixture, said process comprising the step of:

a) contacting a gaseous mixture comprising $CO_2$ and $CH_4$ with either or both of:
  i. a solid mixed oxide material of the first or fifth aspect, and
  ii. a reduced or partially-reduced solid mixed oxide material of the third or sixth aspect, wherein step a) is conducted at a temperature of 500-1000° C.

The solid mixed oxide materials and reduced or partially-reduced solid mixed oxide materials of the invention boast a number of advantages over conventional materials used in catalysing hydrocarbon reforming reactions (e.g. dry reforming). Perhaps most notably, the solid mixed oxide materials and reduced or partially-reduced solid mixed oxide materials of the invention use a catalytic amount of inexpensive nickel rather than a similar quantity of an expensive noble metal. Moreover, unlike conventional catalysts, the solid mixed oxide materials and reduced or partially-reduced solid mixed oxide materials of the invention can catalyse hydrocarbon reforming reactions at temperatures as low as 500° C. without suffering deactivation by sintering, coking or sulfur poisoning. Accordingly, the solid mixed oxide materials and reduced or partially-reduced solid mixed oxide materials of the invention represent a sizeable development in improving the cost-effectiveness of the industrial-scale reforming of hydrocarbons, such as methane.

In an embodiment, step a) is conducted at a temperature of 550-850° C. Considering that hydrocarbon reforming reactions are often conducted over extended periods of time, lower reaction temperatures translate into a significant cost saving. In spite of this, it is understood that carbon formation is favoured at lower operating temperatures, which can have a deleterious effect on the performance of conventional catalysts. In contrast, the solid mixed oxide materials and reduced or partially-reduced solid mixed oxide materials of the invention demonstrate remarkable catalytic properties in the range of 550-850° C. over operational periods as long as 350 hours. Suitably, step a) is conducted at a temperature of 550-800° C. More suitably, step a) is conducted at a temperature of 575-800° C. Yet more suitably, step a) is conducted at a temperature of 600-775° C. Yet more suitably, step a) is conducted at a temperature of 650-750° C.

In an embodiment, step a) is conducted at a space velocity (WHSV) of 10-120 $Lg^{-1} h^{-1}$. Suitably, step a) is conducted at a space velocity (WHSV) of 10-60 $Lg^{-1} h^{-1}$. More suitably, step a) is conducted at a space velocity (WHSV) of 10-40 $Lg^{-1} h^{-1}$. Yet more suitably, step a) is conducted at a space velocity (WHSV) of 12-35 $Lg^{-1} h^{-1}$.

In an embodiment, step a) is conducted at a pressure of 0.8-1.2 atmospheres. Suitably, step a) is conducted at a pressure of 0.95-1.05 atmospheres.

In an embodiment, the gaseous mixture used in step a) comprises $CH_4$ and $CO_2$ in a molar ratio of 0.5:1-2:1. Suitably, the gaseous mixture used in step a) comprises $CH_4$ and $CO_2$ in a molar ratio of 0.9:1-1.1:1.

In an embodiment, the gaseous mixture used in step a) is a biogas. Biogas will be understood to refer to a mixture of gases, including at least $CO_2$ and $CH_4$, produced by the breakdown of organic matter in the absence of oxygen. Biogases typically further comprise small quantities of one or more of $H_2S$, moisture and siloxanes.

In an embodiment, the catalytic reforming process may be a dry reforming, bi-reforming or tri-reforming process, or a combination of two or more thereof. Suitably, the catalytic reforming process is a dry reforming process.

In an embodiment, the catalytic reforming process is performed according to a fixed bed regime.

EXAMPLES

One or more examples of the invention will now be described, for the purpose of illustration only, with reference to the accompanying figures, in which.

Figure 8A:
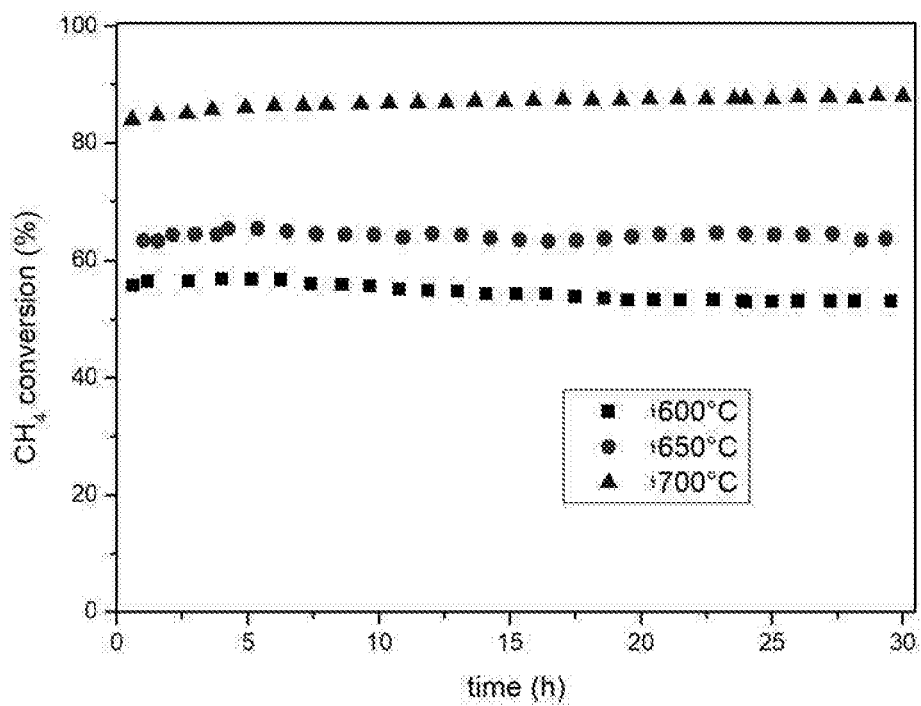
Figure 8B:
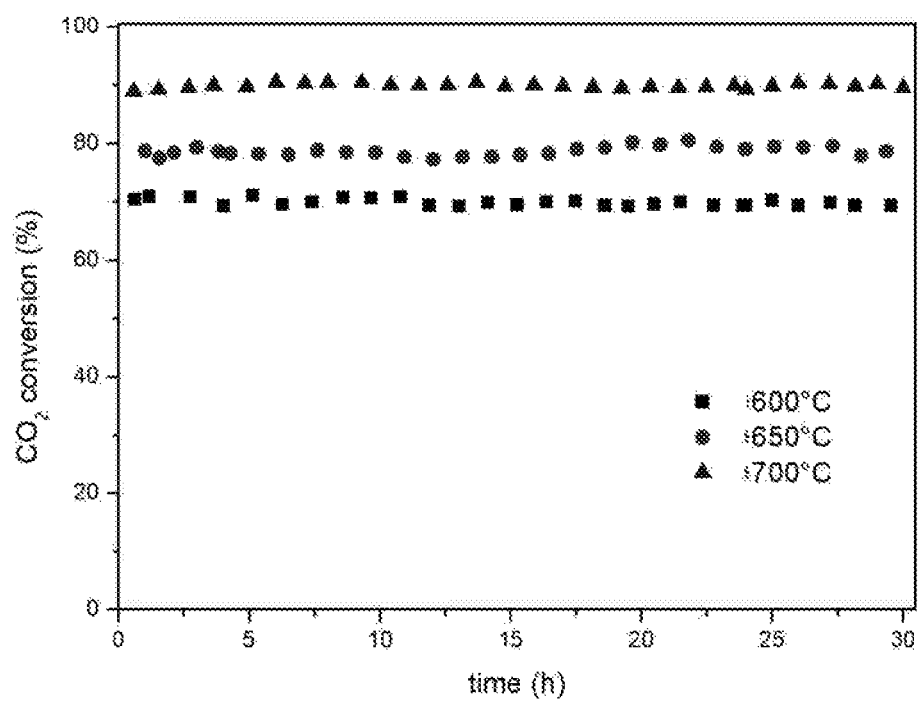
Figure 8C:
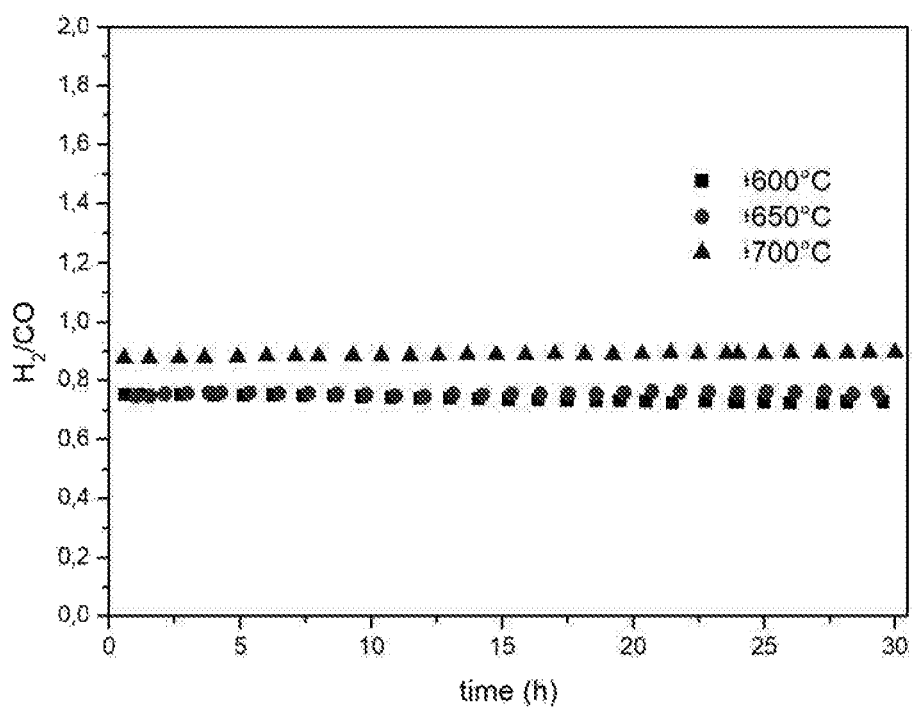

FIG. 8 shows the influence of temperature on catalytic activity and stability for the 10 wt. % Ni based catalyst LNZ10. (a) $CH_4$ conversion; (b) $CO_2$ conversion; (c) $H_2/CO$ ratio. Reaction conditions: P=1 atm; $CH_4/CO_2$=1; T=600° C., 650° C., 700° C.; WHSV=30000 mLg$^{-1}$ h$^{-1}$.

Figure 9A:
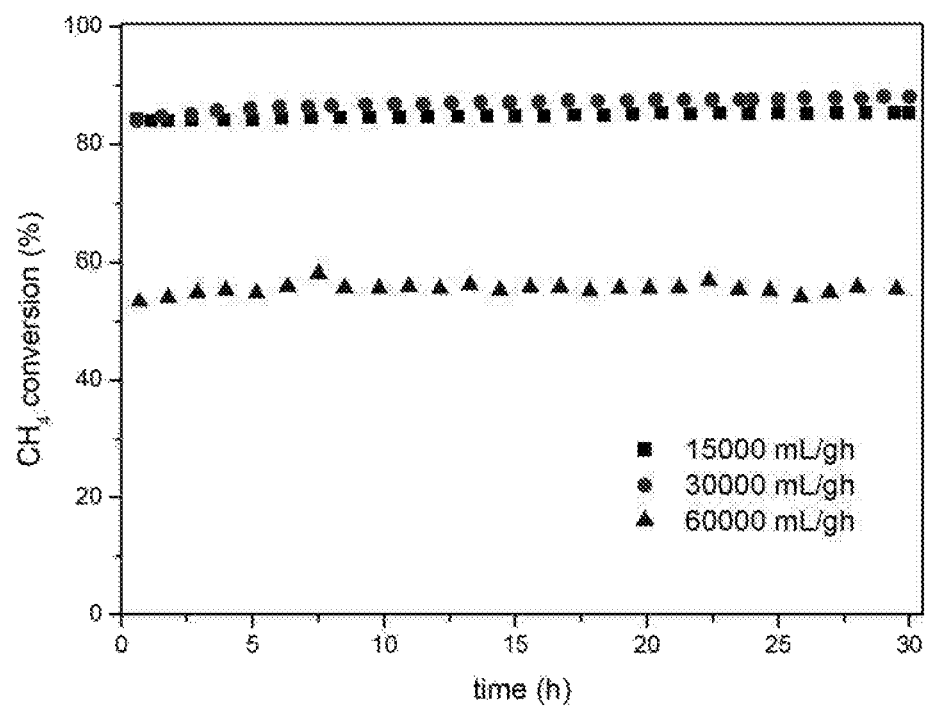
Figure 9B:
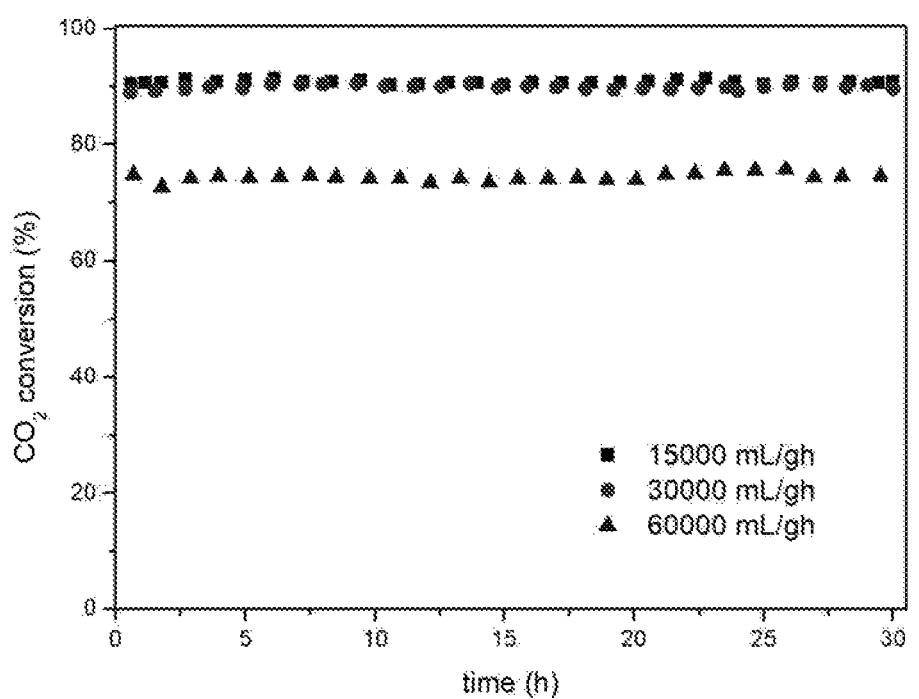
Figure 9C:
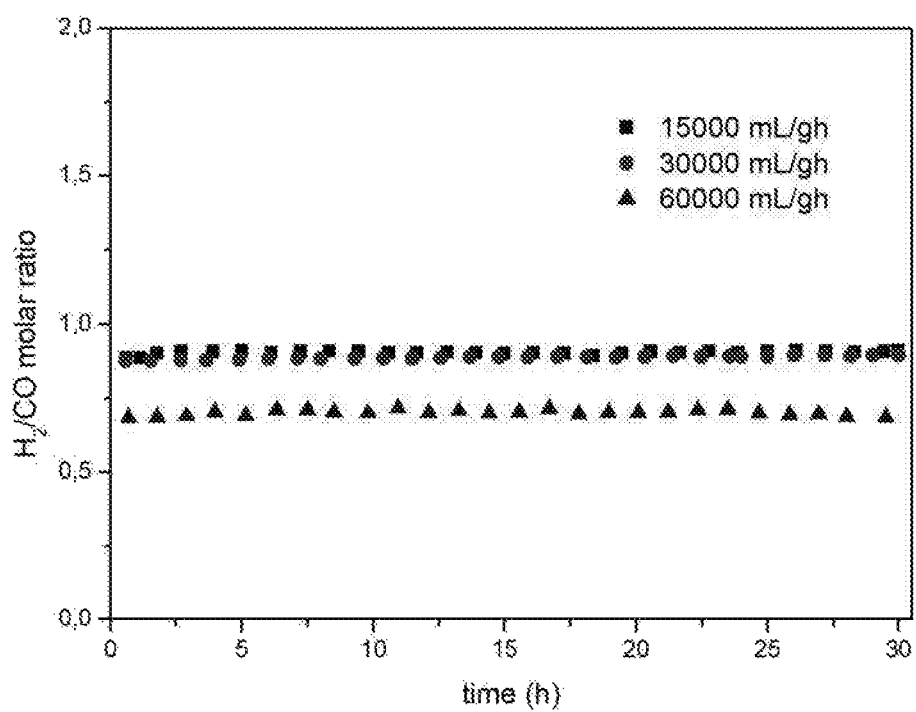

FIG. 9 shows the influence of space velocity on catalytic activity and stability for the 10 wt. % Ni based catalyst LNZ10. (a) $CH_4$ conversion; (b) $CO_2$ conversion; (c) $H_2/CO$ ratio. Reaction conditions: P=1 atm; $CH_4/CO_2$=1; T=700° C.; WHSV=15000, 30000 and 60000 mLg$^{-1}$ h$^{-1}$.

Figure 10:
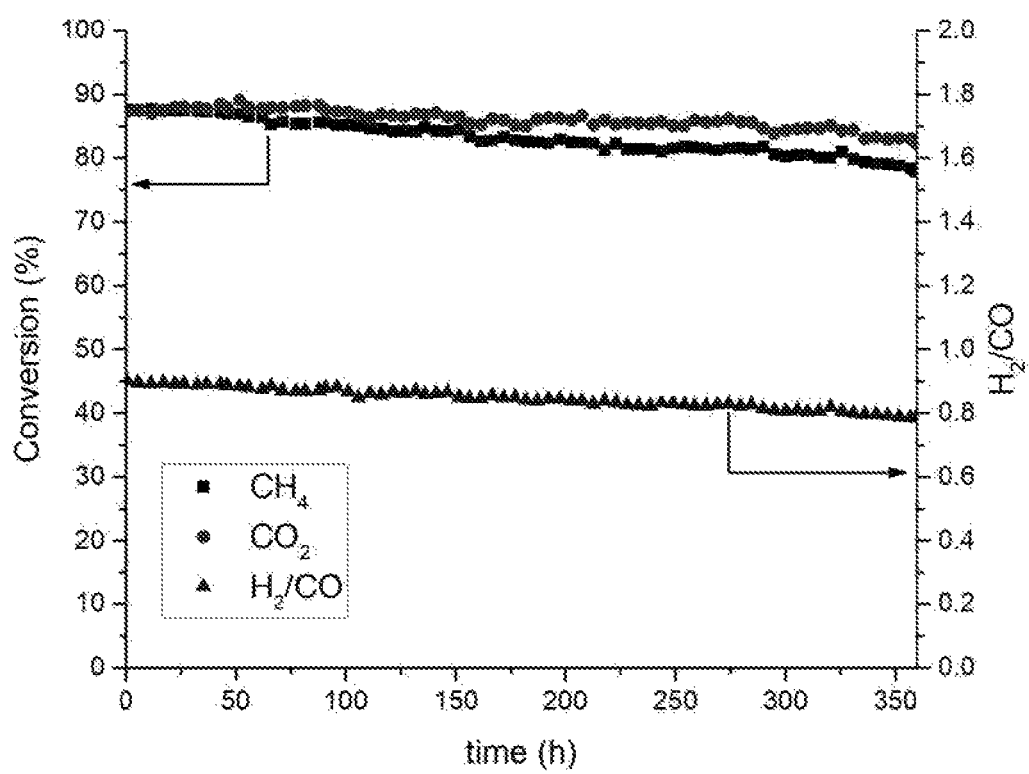

FIG. 10 shows the long-term stability test for the 10 wt. % Ni based catalyst LNZ10. Reaction conditions: P=1 atm, $CH_4/CO_2$=1, T=700° C., WHSV=30000 mLg$^{-1}$ h$^{-1}$.

Example 1—Synthesis of Solid Mixed Oxide Materials

General Synthesis

The general protocol for preparing the pyrochlore-based solid mixed oxide materials is as follows: The precursors used for La, Ni, and Zr were lanthanum nitrate [La(NO$_3$)$_3$-6H$_2$O], nickel nitrate [Ni(NO$_3$)$_2$-6H$_2$O], and zirconyl nitrate [ZrO(NO$_3$)$_2$-6H$_2$O], respectively. The necessary amount of nitrate salts were separately dissolved in deionized water and then mixed with a citric acid (CA) solution in a molar ratio of CA:metal=0.6:1. The solution was stirred for 10 min and concentrated in the rotary evaporator. The resulting mixture was transferred into a petri dish and dried at 100° C. under air overnight. The nitrate precursors started to decompose which was evident by NOx release. The resulting material was then crushed into a fine powder and calcined at 1000° C. for 8 h.

Figure 1:
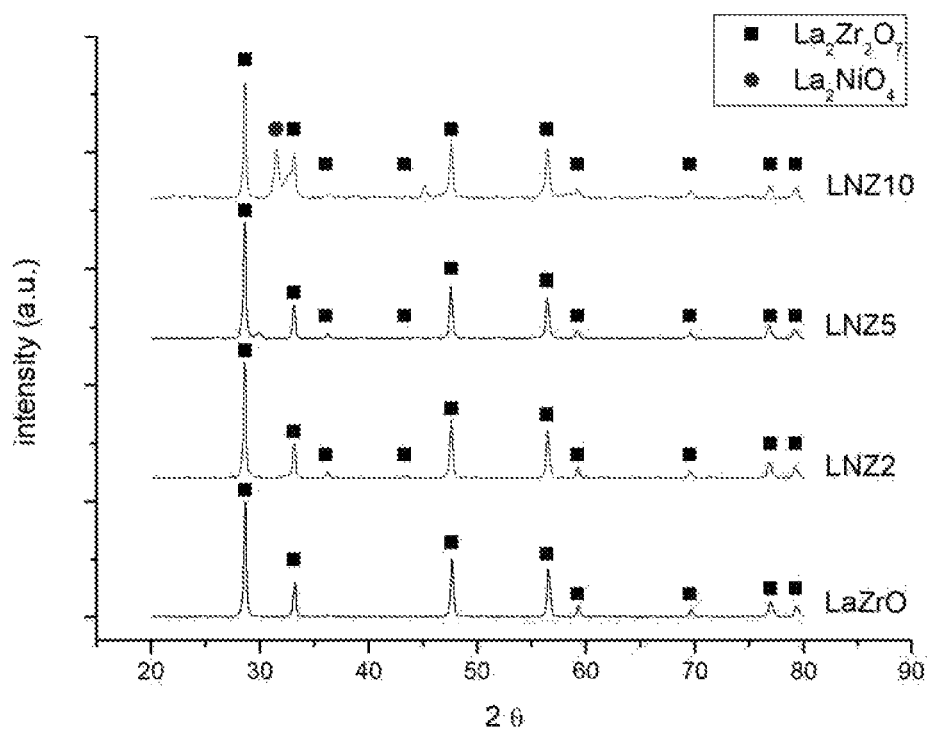
FIG. 1 shows the X-ray diffraction patterns of the as-prepared LaZrO, LNZ2, LNZ5 and LNZ10 samples.

The pure pyrochlore La$_2$Zr$_2$O$_7$ was prepared and labeled LaZrO for simplicity. A series of Ni-containing pyrochlore-based solid mixed oxide materials were then prepared by substitution of Zr with Ni to give materials with 2, 5 and 10 wt % theoretical loading of Ni, labeled respectively as LNZ2, LNZ5 and LNZ10. The respective amounts of the metal precursors used in the preparation of 1 g of each sample are outlined below:

LaZrO (0 wt % Ni) (Reference Example)
[La(NO$_3$)$_3$-6H$_2$O]-1.51 g
[ZrO(NO$_3$)$_2$-6H$_2$O]-1.19 g
LNZ2 (2 wt % Ni) (Reference Example)
[La(NO$_3$)$_3$-6H$_2$O]-1.53 g
[ZrO(NO$_3$)$_2$-6H$_2$O]-1.08 g
[Ni(NO$_3$)$_2$-6H$_2$O]-0.10 g
LNZ5 (5 wt % Ni)
[La(NO$_3$)$_3$-6H$_2$O]-1.55 g
[ZrO(NO$_3$)$_2$-6H$_2$O]-0.93 g
[Ni(NO$_3$)$_2$-6H$_2$O]-0.25 g
LNZ10 (10 wt % Ni)
[La(NO$_3$)$_3$-6H$_2$O]-1.60 g
[ZrO(NO$_3$)$_2$-6H$_2$O]-0.68 g
[Ni(NO$_3$)$_2$-6H$_2$O]-0.49 g Example 2—Characterisation of Solid Mixed Oxide Materials X-Ray Diffraction Analysis FIG. 1 shows the X-ray diffraction pattern for LaZrO, LNZ2, LNZ5 and LNZ10. The pyrochlore crystalline phase (La$_2$Zr$_2$O$_7$) is clearly present in all samples. At higher loadings of Ni (e.g. LNZ10), a second crystalline phase attributable to the Ruddlesden-Popper crystal structure is present.

Figure 2:
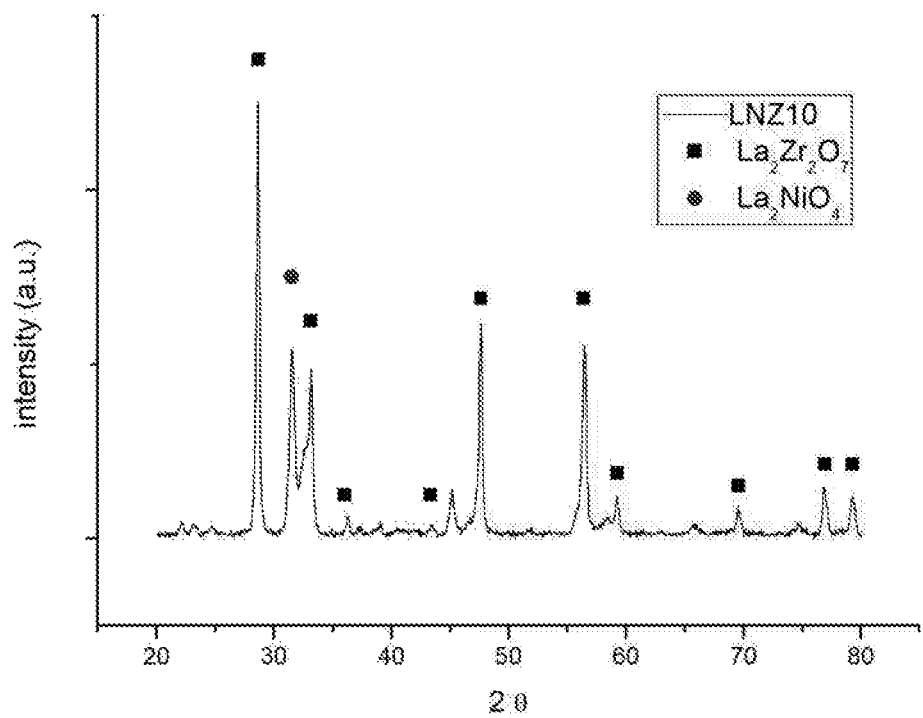
FIG. 2 shows the X-ray diffraction pattern of the reduced LNZ10 sample.

FIG. 2 shows the X-ray diffraction pattern for reduced LNZ10. It is clear that both the pyrochlore crystalline phase and the Ruddlesden-Popper crystalline phase remain in the reduced sample.

Raman Spectroscopy

Figure 3:
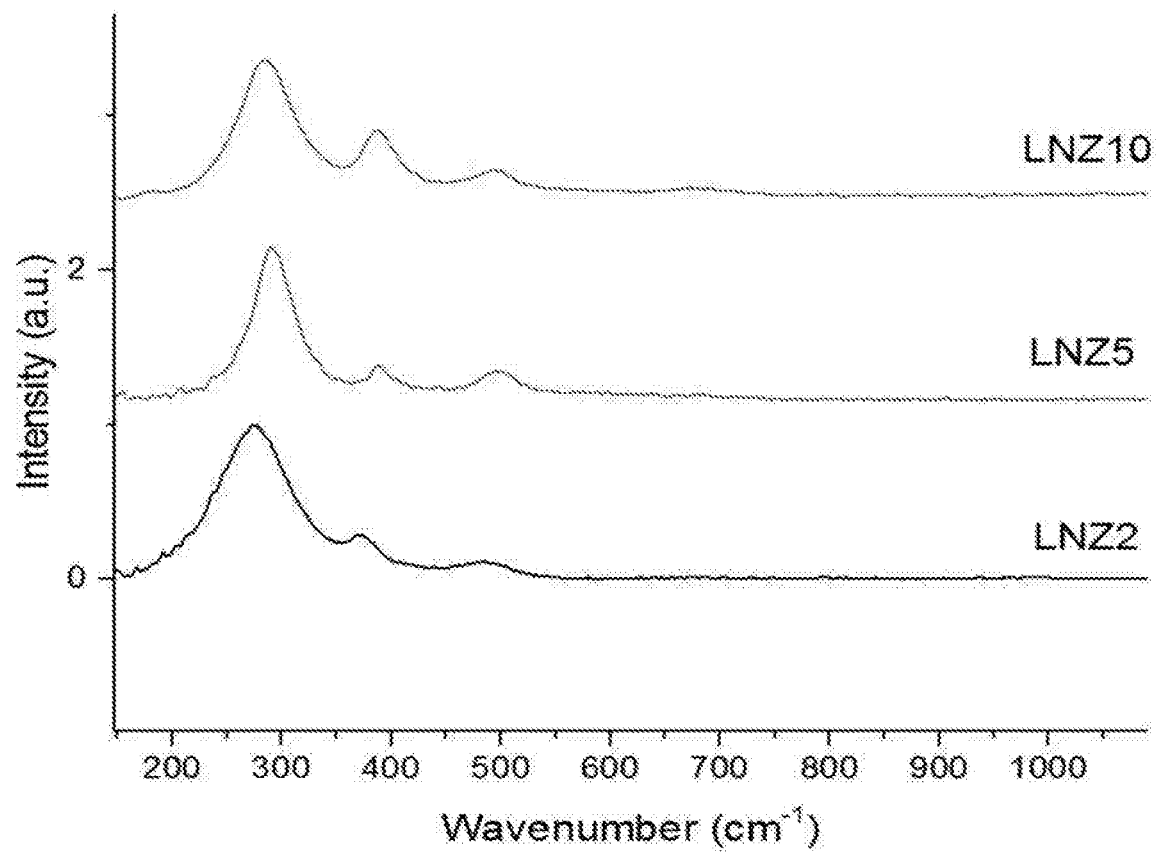
FIG. 3 shows the Raman spectra of the LNZ2, LNZ5 and LNZ10 samples.

FIG. 3 shows the Raman spectra of LNZ2, LNZ5 and LNZ10. It is clear that the Raman bands are sharp and ordered, indicating the presence of an ordered pyrochlore structure, rather than a disordered fluorite structure. The first intense peak corresponds to the $E_g$ internal La—O stretching mode, with the other two peaks corresponding to the $T_{2g}$ modes of pyrochlore.

Scanning Electron Microscopy

Figure 4:
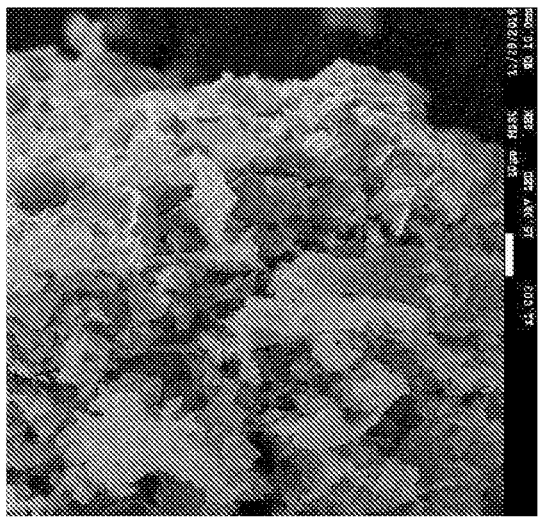
FIG. 4 shows SEM images of the LNZ2 (left), LNZ5 (middle) and LNZ10 (right) samples.
Figure 4:
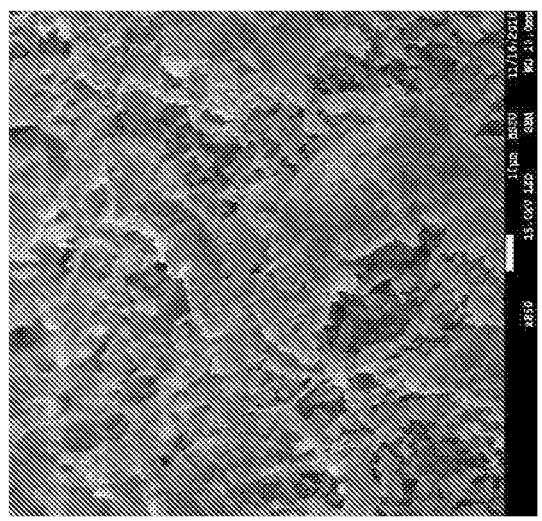
Figure 4:
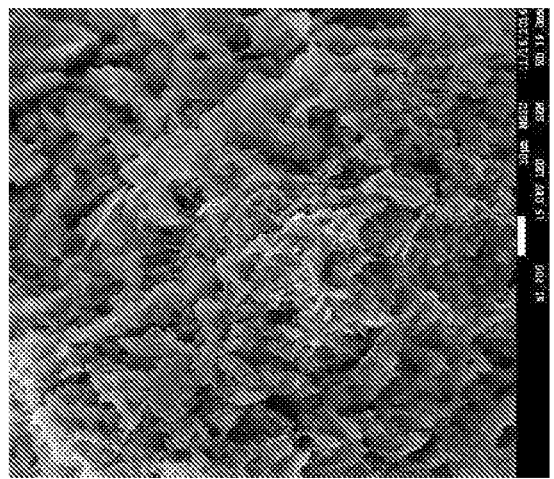

FIG. 4 shows SEM images of LNZ2, LNZ5 and LNZ10. The porous morphology of the samples is clear from the images.

Energy-Dispersive X-Ray Analysis

EDX analysis was carried out during SEM experiments. Table 1 below shows the chemical composition of the LNZ2, LNZ5 and LNZ10 samples obtained from EDX analysis. It is clear from the table that the actual Ni loadings are rather close to the nominal values, thereby corroborating the successful synthesis method.

TABLE 1

| Chemical composition of LNZ2, LNZ5 and LNZ10 as determined by EDX analysis | | | | |
|---|---|---|---|---|
| | wt % O | wt % Ni | wt % Zr | wt % La |
| LNZ2 | 14.6 +/− 0.1 | 3.1 +/− 0.3 | 29.4 +/− 0.2 | 52.5 +/− 0.3 |
| LNZ5 | 12.3 +/− 0.1 | 6.6 +/− 0.3 | 25.4 +/− 0.1 | 55.6 +/− 0.3 |
| LNZ10 | 15.5 +/− 0.1 | 11.6 +/− 0.3 | 20.4 +/− 0.1 | 52.5 +/− 0.3 |

Temperature Programmed Reduction Analysis

TPR analysis was used to record the temperature at which the samples are reduced (consuming hydrogen). The analysis (see FIG. 5) shows that the support LaZrO is hardly reducible, therefore the peaks of hydrogen consumption for LNZ2, LNZ5 and LNZ10 are mainly attributed to the reduction of nickel only.

Figure 5:
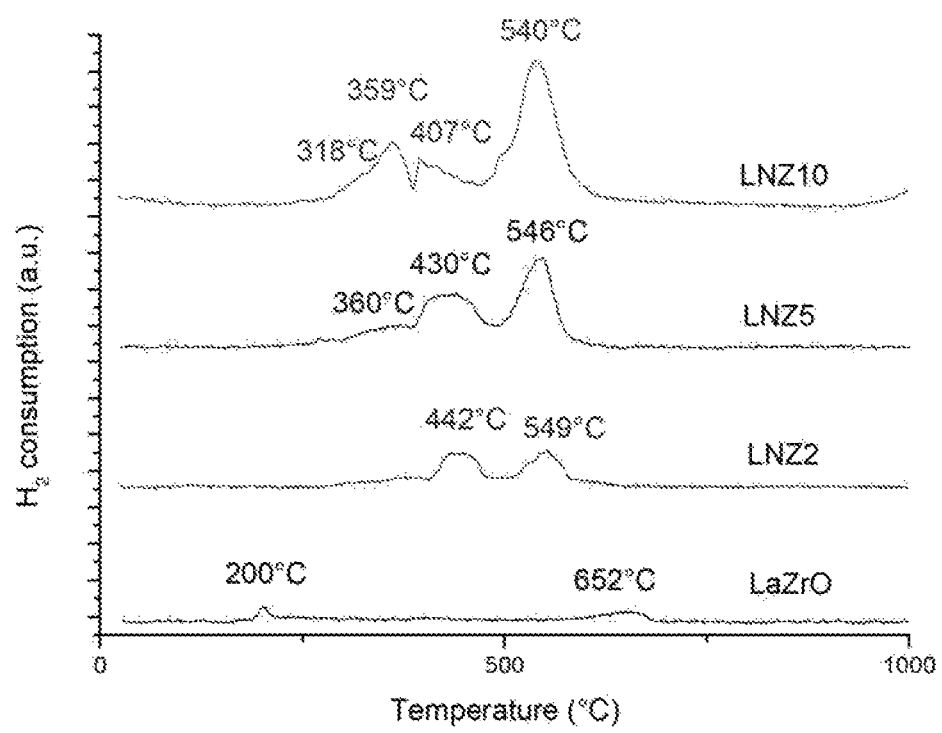
FIG. 5 shows the TPR patterns of the LaZrO, LNZ2, LNZ5 and LNZ10 samples.

The TPR pattern in FIG. 5 shows that for LNZ2 and LNZ5, the TPR profile is very similar. However, for LNZ10, an extra peak is visible, which indicates the presence of a different structure containing nickel. This result appears to corroborate the XRD analysis indicating that LNZ10 contains both pyrochlore and Ruddlesden-Popper crystalline phases.

Textural Properties

Figure 6:
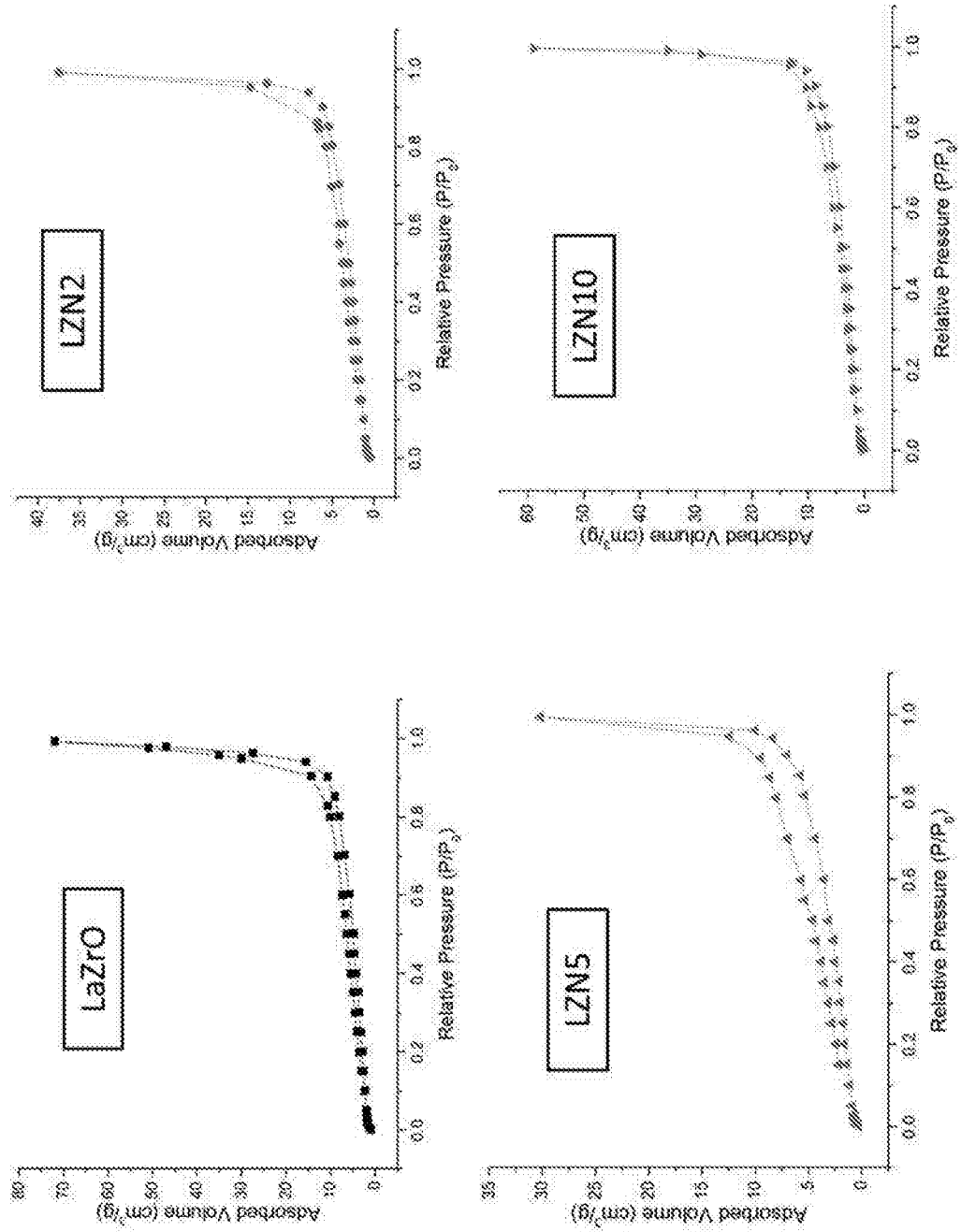
FIG. 6 shows the $N_2$ adsorption-desorption isotherms of the LaZrO, LNZ2, LNZ5 and LNZ10 samples.

FIG. 6 shows the nitrogen adsorption-desorption isotherms for the as-prepared LNZ2, LNZ5 and LNZ10 samples. The isotherms can be categorised as "type IV", which is characteristic of mesoporous materials.

Table 2 below outlines the textural properties of the LaZrO, LNZ2, LNZ5 and LNZ10 samples.

TABLE 2

Textural properties of LaZrO, LNZ2, LNZ5 and LNZ10

| Sample | Surface area ($m^2/g$) | Pore volume ($cm^3/g$) | Average pore size (nm) |
|---|---|---|---|
| LaZrO | 13 | 0.110 | 3.05 |
| LNZ2 | 7 | 0.057 | 3.41 |
| LNZ5 | 9 | 0.046 | 4.31 |
| LNZ10 | 11 | 0.091 | 4.31 |

Example 3—Catalytic Activity Tests

General Protocol

The catalytic activity tests were carried out in a ¼ inch continuous flow quartz reactor, at a pressure of 1 atmosphere and a $CH_4/CO_2$ ratio of 1. Prior to the reaction the samples were activated in $H_2$/He during 1 h at 700° C.

Nickel Loading Effect

Figure 7A:
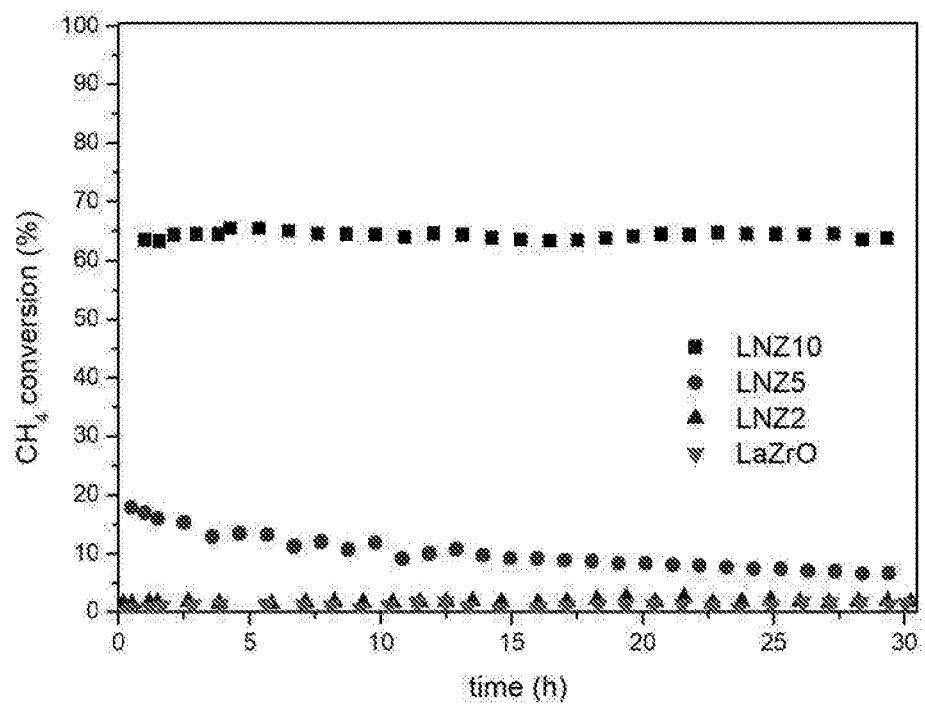
FIG. 7 shows the influence of Ni metal loading (0, 2, 5, 10 wt. % Ni) on catalytic activity and stability. (a) $CH_4$ conversion; (b) $CO_2$ conversion; (c) $H_2/CO$ ratio. Reaction conditions: P=1 atm, $CH_4/CO_2$=1, T=650° C., WHSV=30000 mLg$^{-1}$ h$^{-1}$.
Figure 7B:
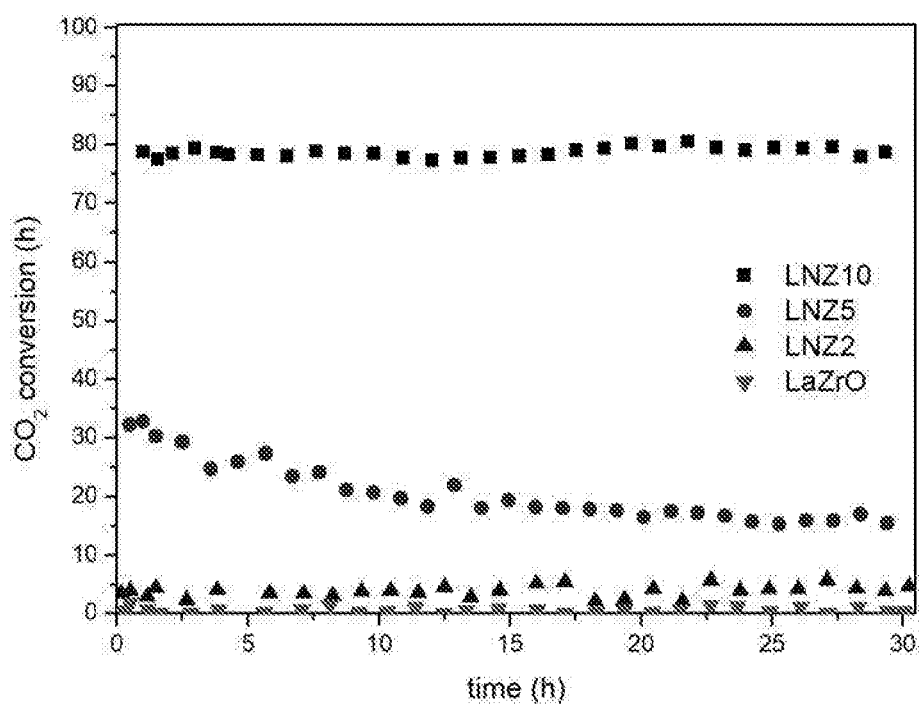
Figure 7C:
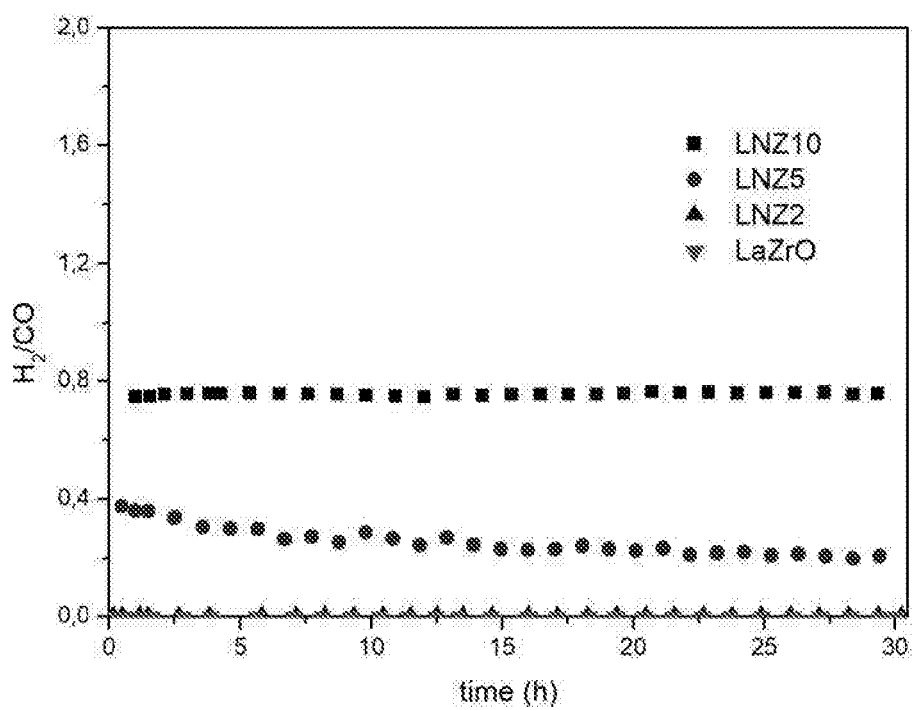

FIG. 7 shows the influence of metal loading (0-10 wt. %) on the catalytic activity and the stability of the reduced samples at 650° C. The activity is expressed in terms of $CH_4$ conversion (FIG. 7(a)) and $CO_2$ conversion (FIG. 7(b)). FIG. 7(c) displays the $H_2$/CO ratio, which gives an indication of the products distribution. It is observed that increasing the nickel loading of the catalyst results in an increase in both catalytic activity and stability. The lanthanum zirconate pyrochlore alone (LaZrO) and the 2% Ni sample (LNZ2) show no activity for dry reforming. In contrast, the 5% Ni sample (LNZ5) shows good catalytic activity. The 10% Ni sample (LNZ10) shows outstanding performance, being comparable or even superior to the activity levels achieved using expensive noble metal-based catalysts. This sample (LNZ10) was then taken forward to be tested under different reaction conditions.

Temperature Effect

The catalytic properties of the reduced LNZ10 sample were tested at various temperatures. FIG. 8 shows that remarkable conversions levels can be achieved using LNZ10 even when working at temperatures as low at 600° C., which would otherwise result in the poisoning of certain other catalysts due to carbon formation. The results at 700° C. in terms of $CO_2$ and $CH_4$ conversion are exceptional, with the $H_2$/CO ratio of the produced syngas being close to 1 (the maximum imposed by thermodynamics), thereby illustrating the usefulness of the material for chemical $CO_2$ recycling.

Space Velocity Effect

Space velocity is directly related to the volume of the reactor needed to perform the experiment and hence to the cost of the process. As a consequence, it is important to find the optimum condition to run the process to minimise capital cost in a real application for fuel processing.

The catalytic performance of the reduced LNZ10 sample was tested at different space velocities. FIG. 9 shows that whilst there is no significant difference between WHSV of 15 and 30 $Lg^{-1} h^{-1}$, the use of 60 $Lg^{-1} h^{-1}$ does have an effect on the performance of the catalyst.

Stability Testing

The long-term stability of hydrocarbon reforming catalysts is a key factor for industrial scale-up. Many catalysts become deactivated over time due a process of coking (carbon formation) or metal sintering.

The catalytic properties of the reduced LNZ10 sample were tested over an extended period of time to investigate the stability of the material. FIG. 10 shows that when tested over a period of 350 hours, the reduced LNZ10 sample exhibited only a 6% decrease in activity, thereby underlining the exceptional long-term stability properties of the material.

While specific embodiments of the invention have been described herein for the purpose of reference and illustration, various modifications will be apparent to a person skilled in the art without departing from the scope of the invention as defined by the appended claims.

The invention claimed is:

1. A solid mixed oxide material suitable for use in catalysing a methane dry reforming reaction, wherein the solid mixed oxide material comprises a first crystalline phase, the first crystalline phase being attributable to a pyrochlore crystal structure, and wherein the solid mixed oxide material comprises 7.5-13.0% of nickel by weight relative to a total weight of the solid mixed oxide material, and wherein the first crystalline phase has a composition according to general formula (I) shown below $$A_2B_2O_7 \quad (I)$$

wherein:
A is a trivalent cation of La, and optionally one or more other trivalent cation of an element selected from the group consisting of Ce, Pr, Nd, Sm, Sc, Y and Eu; and
B is a mixture of:
(i) a tetravalent cation of Zr, and optionally one or more other tetravalent or trivalent cation of an element selected from the group consisting of Ti, Cr, Mn and Mo, and
(ii) a divalent cation of Ni,
and wherein the solid mixed oxide material comprises a second crystalline phase, the second crystalline phase being attributable to a Ruddlesden-Popper crystal structure of general formula (II) shown below:

$$A'_2B'O_4 \quad (II)$$

wherein:
A' is a trivalent cation of La, and optionally one or more other trivalent cation of an element selected from the group consisting of Ce, Pr, Nd, Sm, Sc, Y and Eu; and
B' is a divalent cation of Ni, and optionally one or more other divalent, trivalent or tetravalent cations of an element selected from the group consisting of Fe, Co, Cu, Ti and Zr;
wherein the solid mixed oxide material has a surface area of 9-14 $m^2/g$, a pore volume of 0.06-0.13 $cm^3/g$ and an average pore size of 3.5-5.5 nm.

2. The solid mixed oxide material of claim 1, wherein the solid mixed oxide material comprises 9.5-13.0% of nickel by weight relative to the total weight of the solid mixed oxide material.

3. The solid mixed oxide material of claim 1, wherein:
A is a trivalent cation of La; and
B is a mixture of:
i. a tetravalent cation of Zr, and
ii. a divalent cation of Ni.

4. The solid mixed oxide material of claim 1, wherein the solid mixed oxide material comprises 15.0-35.0% of zirconium by weight relative to the total weight of the solid mixed oxide material, and/or the solid mixed oxide material comprises 48.0-60.0% of lanthanum by weight relative to the total weight of the solid mixed oxide material.

5. The solid mixed oxide material of claim 1, wherein
the solid mixed oxide material is in a form of a powder, pellet or foam, and/or
the solid mixed oxide material is self-supported.

6. The solid mixed oxide material of claim 1, wherein: A' is a trivalent cation of La, and B' is a divalent cation of Ni, and optionally a tetravalent cation of Zr.

7. The solid mixed oxide material of claim 1, wherein the solid mixed oxide material further comprises 0.001-0.5% of at least one promoter by weight relative to the total weight of the solid mixed oxide material, and wherein the at least one promoter is selected from the group consisting of Sn, Ba, Ca, Mg, Ce, Sr, K, Pt, Rh, Pd, Mo, Ag, Au, Ru, Zn, Cu, Co and Ir.

8. A process for the preparation of the solid mixed oxide material as claimed in claim 1, said process comprising steps of:
   a) providing a mixture comprising
      i. at least one solvent;
      ii. metal precursors, respective amounts of the metal precursors being sufficient to form a pyrochlore crystalline phase in the solid mixed oxide material resulting from step c), and
      iii. at least one chelating agent;
   b) drying the mixture of step a); and
   c) thermally treating a solid material resulting from step b) at a temperature greater than 800° C.,
wherein at least one of the metal precursors mixed in step a) is a nickel precursor in an amount sufficient to provide a nickel content in the solid mixed oxide material resulting from step c) of 3.5-25.0% by weight relative to a total weight of the solid mixed oxide material.

9. The process of claim 8, wherein the at least one solvent is selected from the group consisting of water, methanol, ethanol and acetone.

10. The process of claim 8, wherein the at least one chelating agent is selected from the group consisting of citric acid, ethylenediaminetetraacetic acid (EDTA), disodium EDTA, trisodium EDTA, ethylene glycol-bis(β-aminoethyl ether)-N,N,N',N'-tetraacetic acid (EGTA) and succinic acid.

11. The process of claim 8, wherein the mixture of step a) comprises at least one chelating agent in an amount sufficient to give a molar ratio of total chelating agent to metal in the mixture of (0.3-1.0):1.

12. The process of claim 8, wherein step c) comprises thermally treating the solid material resulting from step b) at a temperature of 800-1500° C.

13. The process of claim 8, wherein step c) is performed for 4-24 hours.

14. The process of claim 8, wherein the mixture provided in step a) further comprises:
   iv. at least one Sn, Ba, Ca, Mg, Ce, Sr, K, Pt, Rh, Pd, Mo, Ag, Au, Ru, Zn, Cu, Co or Ir-based promoter precursor in an amount sufficient to provide a promoter content in the solid mixed oxide material resulting from step c) of 0.001-0.5% by weight relative to the total weight of the solid mixed oxide material.

15. A reduced or partially-reduced solid mixed oxide material, wherein the reduced or partially-reduced solid mixed oxide material is a reduced or partially-reduced form of the solid mixed oxide material as claimed in claim 1.

16. A process for catalytically reforming a gaseous mixture, said process comprising a step of:
   a) contacting a gaseous mixture comprising $CO_2$ and $CH_4$ with either or both of:
      i. the solid mixed oxide material as claimed in claim 1, and
      ii. a reduced or partially-reduced solid mixed oxide material wherein the reduced or partially-reduced solid mixed oxide material is a reduced or partially-reduced form of the solid mixed oxide material as claimed in claim 1,
wherein step a) is conducted at a temperature of 500-1000° C.

17. The process of claim 16, wherein step a) is conducted at a temperature of 550-850° C.

18. The process of claim 16, wherein step a) is conducted at a space velocity (WHSV) of 10-120 $Lg^{-1}\ h^{-1}$.

19. The process of claim 16, wherein the process is a dry reforming, bi-reforming or tri-reforming process, or a combination of two or more thereof.

* * * * *